United States Patent
Hallamasek

Patent Number: 5,836,533
Date of Patent: Nov. 17, 1998

[54] HYBRID ARM-POSITION/TAPE-TENSION SERVOCONTROL SYSTEM

[75] Inventor: Kurt F. Hallamasek, Oakland, Calif.

[73] Assignee: Ampex Corporation, Redwood City, Calif.

[21] Appl. No.: 740,674

[22] Filed: Oct. 31, 1996

[51] Int. Cl.⁶ .................................................. G11B 15/43
[52] U.S. Cl. ................................... 243/334.6; 242/334.2; 360/79.14
[58] Field of Search .......................... 242/334.2, 334.6; 360/71, 73.14, 74.3, 85, 95

[56] References Cited

U.S. PATENT DOCUMENTS

| | | | |
|---|---|---|---|
| 2,814,676 | 11/1957 | House | 242/334.2 |
| 4,739,948 | 4/1988 | Rodal et al. | 318/6 |
| 4,868,923 | 9/1989 | Yoshihiro | 360/71 |
| 5,032,936 | 7/1991 | Fujioka et al. | 242/334.2 |
| 5,180,117 | 1/1993 | Katohno et al. | 360/95 |
| 5,248,112 | 9/1993 | Rodal et al. | 360/73.09 |
| 5,287,233 | 2/1994 | Lee et al. | 360/73.14 |
| 5,307,215 | 4/1994 | Inoue et al. | 360/85 |
| 5,310,133 | 5/1994 | Falk et al. | 360/71 |
| 5,313,343 | 5/1994 | Yatomi | 360/73.14 |
| 5,477,400 | 12/1995 | Kawamata | 360/73.14 |
| 5,642,865 | 7/1997 | Fell et al. | 242/334.6 |

FOREIGN PATENT DOCUMENTS 4-14654   1/1992   Japan  ................... 242/334.6

*Primary Examiner*—John P. Darling
*Attorney, Agent, or Firm*—John G. Mesaros; James M. Thomson

[57] ABSTRACT

Servomechanisms (58 and 60) control a takeup reel (12) and a tension arm (16) in a cassette recorder. The servomechanisms receive control signals (54 and 56) generated in accordance with respective control functions, each of which includes a respective constituent function of the difference between a commanded tension-arm position and a measured tension-arm position. In a position of the tension arm that prevails at the beginning of tape threading the constituent of the tension-arm control function that depends on this arm-position error is a relatively large contribution and gradually decreases to zero as the tension arm moves to the position that it assumes for normal recording and playback. During the same time, the the constituent of the reel-control function that depends on arm-position error begins at zero and gradually increases. Such a gradual transfer of position-error-based control suppresses tape-tension transients that would otherwise result.

5 Claims, 5 Drawing Sheets

HYBRID ARM-POSITION/TAPE-TENSION SERVOCONTROL SYSTEM

BACKGROUND OF THE INVENTION

The present invention is directed to magnetic-tape drives. It has particular, although not exclusive, application to drive mechanisms for videocassette recorders.

When a tape cassette 10 (FIG. 1) is initially inserted into a cassette recorder, various mechanisms in the cassette recorder act to extract a length of the tape 11 from the cassette's supply and takeup reels 12 and 14 and thread it through the tape-transport mechanism so that it assumes the position that FIG. 2 illustrates. In that position, tension arms 16 and 18, which typically are spring-loaded, maintain the tape tension required for proper operation, and servomotors not shown in the drawings so control the supply and takeup reels in response to tension-arm feedback as to maintain the respective tension arms in predetermined positions.

As can be appreciated by inspection of the geometry that FIG. 1 depicts, the tension arms are not initially so positioned as to control tape tension accurately. So it is the supply and takeup reels that maintain tension during the initial threading operation. For instance, the takeup-reel servomotor may hold the takeup reel in a fixed position, while the supply-reel servomotor may apply such a torque as to produce approximately the desired tape tension. As part of the threading operation, further servomotors, also not shown, pivot the tension arms 16 and 18 about their respective pivot axes to the more-effective positions that FIG. 2 illustrates. During this operation, the cassette recorder operates the tension-arm servomotors with arm-position feedback to cause the tension arms to follow a prescribed trajectory.

The tension-arm servomechanisms thus operate in two modes. (Actually, there may be other modes, too, but the invention to be described below can be understood most readily by considering only two.) They initially operate in a closed-loop mode, responding to arm-position feedback to keep the tension arm following the commanded trajectory. Then, for recording and playback, they operate in more of an open-loop fashion, simply driving the tension arm with a predetermined (and possibly zero) torque.

The tape-reel servomechanisms similarly operate in two modes. The first is more or less an open-loop mode, in which the servomotors are driven with the currents that, given the tape-spool radius, should exert the desired force on the tape. The second, which prevails during recording and playback, is a closed-loop mode, which employs arm-position feedback to maintain a predetermined tension-arm position.

Switching between the two modes can result in harmful tension transients unless steps are taking to prevent them. So considerable effort has been expended in identifying the threading-operation conditions in which switching between modes results in an acceptably low transient amplitude. Although heuristic approaches to the problem have yielded acceptable performance, they also have tended to impose unwelcome design constraints; a mode-switching position that yields acceptable performance in one design can cause unacceptable transients if a change in, say, the tension-arm trajectory is made for other purposes. Such approaches therefore increase design cost.

SUMMARY OF THE INVENTION

I have recognized that transients can be avoided much more simply by employing a control strategy that in a sense is a hybrid of the two conventional modes. According to the invention, the tension-arm servomechanism operates in accordance with a control function that includes a contribution proportional to the function that prevails in the initial position, where the tension-arm servomechanism employs arm-position feedback to maintain a commanded tension-arm position. That contribution gradually decreases as the tension arm advances toward its final position, where it typically employs no arm-position feedback. Conversely, the reel servomechanism operates in accordance with a control function that includes a contribution proportional to the function that prevails in the final position, in which it is the reel servomechanism that employs arm-position feedback to maintain a commanded tension-arm position. As the corresponding contribution to the tension-arm servomechanism's control function decreases, this contribution to the reel control function increases.

So the reel and tension-arm servomechanisms share tension-arm-position control in intermediate tension-arm positions, and the mode change is therefore gradual. This suppresses transients for a wide range of system designs. Moreover, this control strategy can be implemented in a relatively simple manner.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
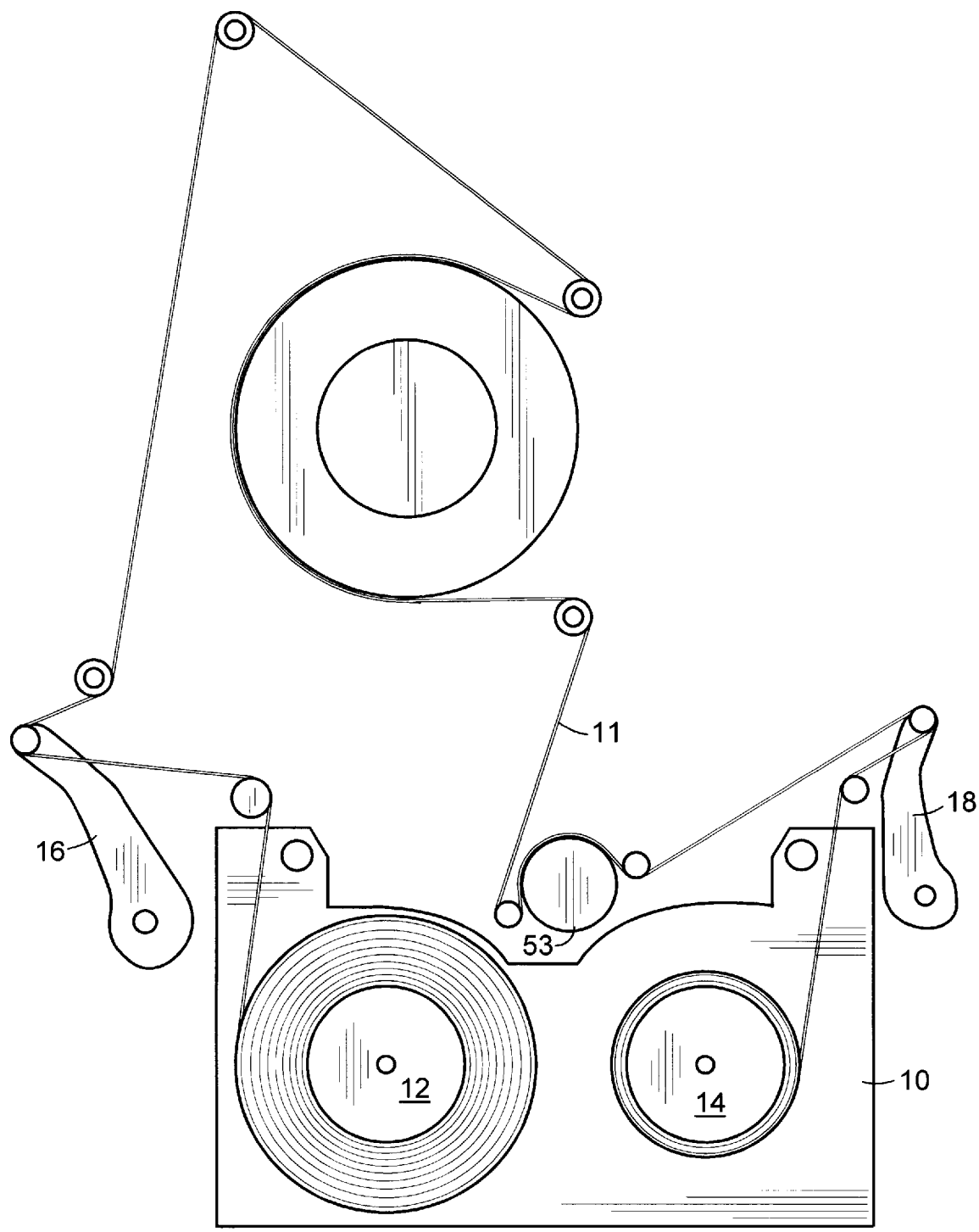
FIG. 2 is a similar diagram depicting the transport mechanism positioned for recording and playback.
Figure 3:
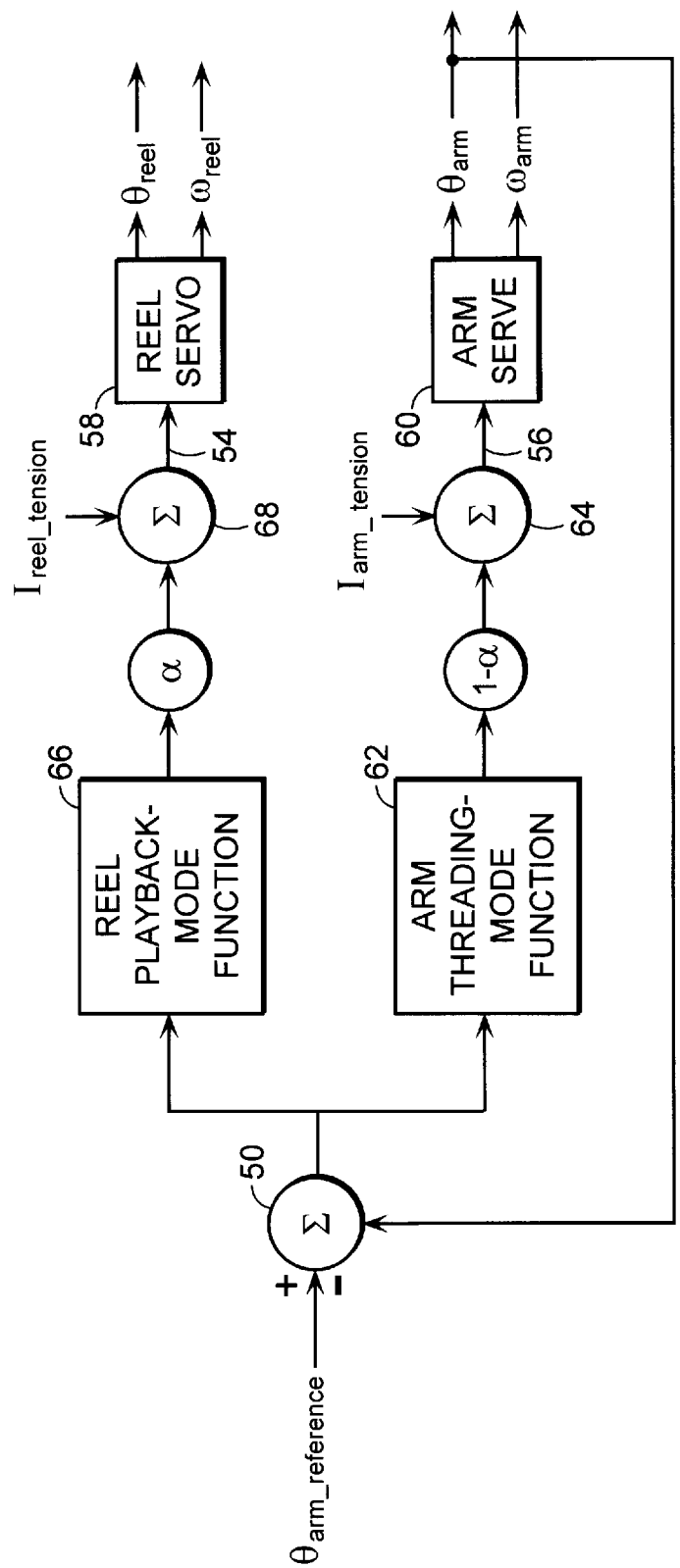
FIG. 3 is a block diagram of the control system for the supply reel and tension arm.

For the sake of concreteness, we will assume that the control system depicted in FIG. 3 controls the supply reel and tension arm 12 and 16, but FIG. 3 applies equally to the control system employed for the takeup reel and tension arm 14 and 18. In this simplified representation, summing junction 50 represents computing an error value from the difference between an arm-position sensor's output $\theta_{arm}$ and a commanded tension-arm position $\theta_{arm\_reference}$. During normal recording and playback operations $\theta_{arm\_reference}$ is typically constant, but during the initial tape-threading operation it is a function of time that specifies the desired tension-arm trajectory between the positions of FIGS. 1 and 2.

As is conventional, the control system of FIG. 3 processes the error signal from the error computation 50 to generate reel and tension-arm drive signals on lines 54 and 56. These signals are respectively applied to the reel and tension-arm servomechanisms 58 and 60. To generate these drive signals, a tape drive that implements the present invention's teachings employs control functions that in many respects are similar to those employed in conventional systems, as will now be explained.

As was stated above, a conventional system responds to tension-arm position during the initial, tape-threading procedure to generate a tension-arm-servomotor control signal that tends to reduce the error between the sensed tension-arm position and the trajectory that the position-commanding signal $\theta_{arm\_reference}$ specifies. Block 62 represents determining such an arm-control value from the tension-arm error in accordance with an appropriate tension-arm control function. That function can be one that simply produces an output proportional to its input, i.e., to the position error. A function more typical for this purpose takes into account the dynamics of the system being controlled. For instance, its output may be the sum of quantities respectively proportional to the error and its derivative. Such "proportional plus derivative" control functions tend to damp out oscillations that system inertia might otherwise cause. A further alternative will be described below in connection with FIG. 5.

Figure 4:
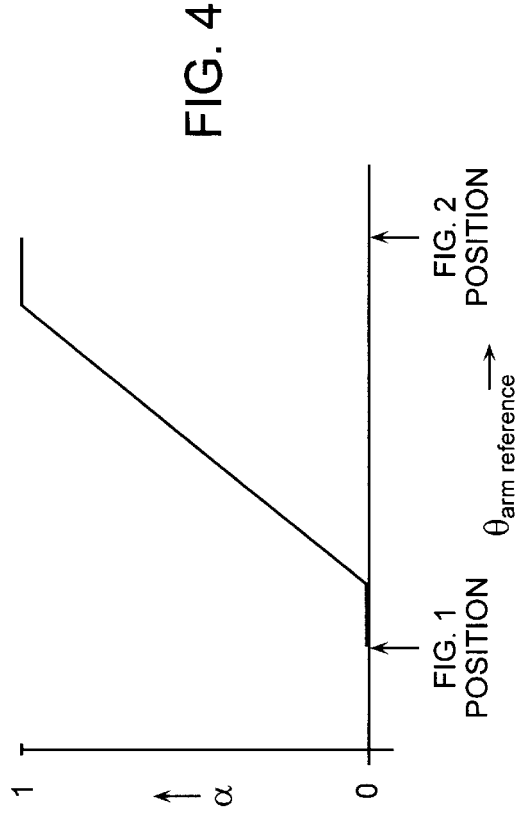
FIG. 4 is a plot of a scheduling coefficient employed in the control system of FIG. 3.

A system that employs the present invention's teachings can base its control of the tension arm on any such function of the position error. Regardless of what that function is, a system that implements the present invention's teachings gradually reduces the effect of arm-position error on the tension-arm servomechanism as the tension arm progresses from its initial, FIG. 1 position to its final, FIG. 2 position. Specifically, the system of FIG. 3 multiplies the arm-control value from operation 62 by a tension-arm scheduling coefficient $1-\alpha$, where $0 \leq \alpha \leq$. The quantity $\alpha$ is a function of tension-arm position that starts at zero when the tension arm is in the FIG. 1 position and increases to unity by the time the tension arm reaches the FIG. 2 position. FIG. 4 plots $\alpha$ as a function of the intended tension-arm position $\theta_{arm\_reference}$. Although the tension-arm scheduling coefficient is a function of intended rather than measured tension-arm position in the illustrated embodiment, this is not a necessary feature of the present invention.

In some designs, the tension-arm servomotors may play a role not only in threading but also in normal recording and playback, when the arms are in the FIG. 2 position. That is, although the tension arms 16 and 18 are typically spring-loaded, the cassette recorder may modify the tension corresponding to a given pivot position by driving a tension arm's servomotor even during recording and playback. Indeed, some designs dispense with the spring altogether, imposing torque only by way of a constant servomotor drive. A summing junction 64 in FIG. 3 shows that such designs can include this additional torque by adding a further constituent $I_{arm\_tension}$.

Figure 1:
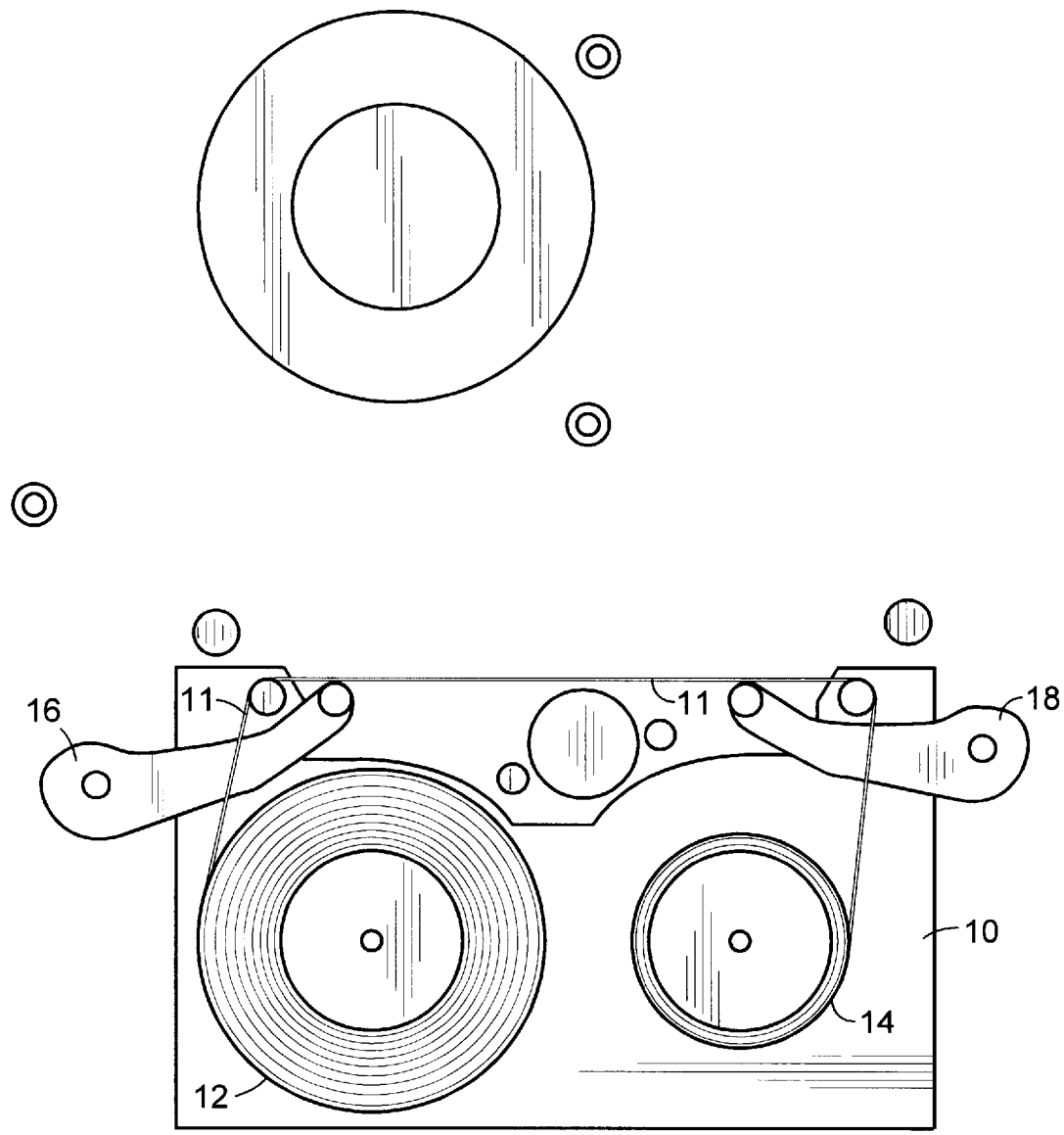
FIG. 1 is a diagram of a cassette-recorder transport mechanism shown in the position that it assumes at the beginning of the threading operation.

Now, inspection of FIGS. 1 and 2 reveals that a value of $I_{arm\_tension}$ great enough to cause a significant tension increase in the FIG. 2 position is likely to result in much greater force than is necessary to balance the tension that the reel imposes in the FIG. 1 position. The static error in the arm-position control necessary to overcome this effect could then be significant. Indeed, a significant static error would be necessary in some systems to overcome the excess spring force alone in the FIG. 1 position. So $I_{arm\_tension}$ may vary with arm position in some embodiments of the present invention and assume a lower value in the FIG. 1 position than in the FIG. 2 position. But $I_{arm\_tension}$ is simply a constant quantity in the illustrated embodiment, because any resultant static error is tolerable in the initial phases of the threading operation.

Just as operation 62 generates a constituent of the arm-control function from the arm-position error, a further operation 66 generates a constituent of the reel-control function from that error. But since such closed-loop reel control is to prevail during recording and playback rather than at the beginning of the threading operation, the scheduling coefficient by which the resultant value is multiplied is $\alpha$ rather than $1-\alpha$. This means that the resultant constituent has a zero value when the threading operation starts.

So it is preferable to add a further constituent $I_{reel\_tension}$, as summing junction 68 indicates, to provide the desired tape tension in the FIG. 1 position. Then, as the tension arm moves towards its FIG. 2 position and the reel scheduling coefficient $\alpha$ increases, the reel servomechanism 58 begins to take over control of tension-arm position—i.e., its contribution that depends on position feedback becomes more prominent while the corresponding contribution to the tension-arm control signal decreases—until it is the reel servomechanism alone that responds to arm-position error and thereby controls tension-arm position exclusively. To minimize the reel-control system's static error, the illustrated embodiment employs a constant $I_{reel\_tension}$ value whose resultant reel force approximates the force that the tension arm imparts in the FIG. 2 position. But other embodiments of the present invention that employ such a constituent may use a variable value. For some types of drive circuitry, for instance, making this constituent depend on reel speed can increase accuracy by compensating for the servomotor's back emf.

Figure 5:
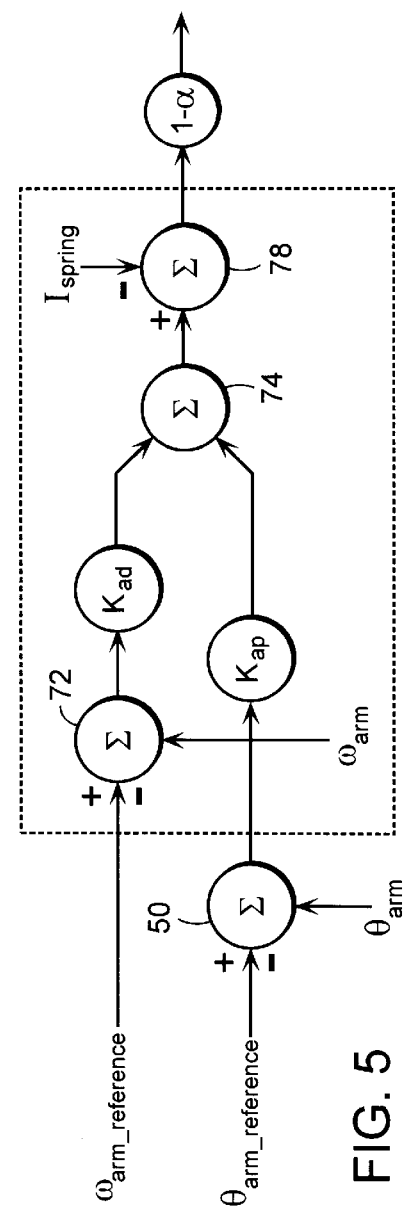
FIG. 5 is a more-detailed diagram depicting the threading-mode control function for the tension arm.

As was stated above, the function of position error that FIG. 3's block 62 represents can be any one of a number of such functions. As FIG. 5 shows, the illustrated embodiment's function employs state feedback, where the state is the tension arm's measured velocity and position. Specifically, the system specifies the tension-arm trajectory by providing signals that not only represent the desired tension-arm position $\theta_{arm\ reference}$ as a function of time but also explicitly give the speed $\omega_{arm\ reference}$ that the position function implies. As summing junction 72 indicates, the illustrated embodiment develops a speed error from the latter quantity by subtracting the measured arm speed $\omega_{arm}$, and it computes a total-error quantity from quantities proportional to the speed and position errors, as summing junction 74 indicates.

Just as in a conventional proportional-plus-derivative system, the static error in FIG. 5's state-feedback system can theoretically be made as small as desired by increasing the system gain factors $K_{ap}$ and $K_{ad}$ in FIG. 5. But also as in such systems, there are practical limits to how high the gain can be. So in order to reduce static error without making the gain too high, we provide a further operation 78, in which we subtract from operation 74's output a quantity $I_{spring}$ that corresponds approximately to the servomotor torque required to balance the tension arm's spring force. To the extent that the torque resulting from $I_{spring}$ does indeed balance the spring force, it eliminates static error for those systems in which the arm-tension-adjusting quantity $I_{arm\_tension}$ added in FIG. 3 is negligible.

Figure 6:
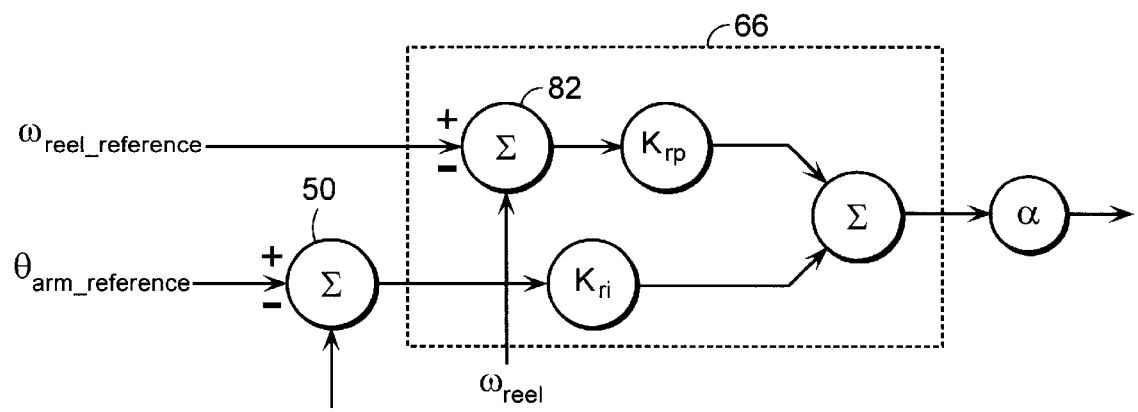
FIG. 6 is a similar diagram depicting the playback-mode control function for the supply reel.

FIG. 6 illustrates one type of position-error function that can be used as the reel playback-mode function of FIG. 3's block 66. As was explained above, the action of the block 66 function predominates when the tension arm is in the FIG. 2 position and $\alpha$ accordingly is unity. This function acts to keep the tension arm in the commanded arm position $\theta_{arm\_reference}$. In doing so, it can be thought of as so controlling reel speed as to keep the speed of the tape leaving the reel equal to that of the tape passing the capstan 53 (FIG. 2). From the capstan speed and measurements of the reel's tape pack, the cassette player generates a signal $\omega_{reel\_reference}$ representing a commanded reel speed that should result in equal reel and capstan tape speeds. A summing junction 82 represents computing the error between the commanded reel speed $\omega_{reel\_reference}$ and the measured reel speed $\omega_{reel}$. This error, multiplied by a proportional-constituent gain $K_{rp}$, is one contribution to block 66's output. The other contribution is the product of an integral-constituent gain $K_{ri}$ and the arm-position error whose computation is represented by summing junction 50. The latter gain is referred to as an "integral-constituent" gain because arm position can be thought of as indicating the integral of the difference between the reel and capstan tape speeds.

Those skilled in the art will recognize that these elements can be implemented in a variety of different ways. For instance, a single digital-signal-processing integrated circuit can receive digital outputs of position and velocity sensors, compute the division-of-control scheduling coefficient $\alpha$ from the current tension-arm position in accordance with the FIG. 4 function, compute the various contributions in accordance with the control functions, and produce the results on multi-bit lines 54 and 56. The reel and arm servomechanisms 58 and 60 can take the form of pulse-width modulators and filters that convert the inputs to analog form, power amplifiers that receive the resultant analog signals, and servomotors, driven by the power amplifiers, that in turn drive the reel and tension arm.

Just as conventional systems do, the system of FIG. 3 initially controls the tension-arm position by position-feedback control of the tension-arm servomechanism, using the reel servomechanism to control tape tension in an open-loop manner, and it ends up controlling the tension-arm position by position-feedback control of the reel servomechanism, performing the open-loop control of tape tension through the arm servomechanism. But it differs from conventional systems in that it converts from one mode to the other in a gradual manner, and it thereby largely avoids transients that result from conventional mode switching.

Of course, the resultant degree of transient suppression depends on the particular relationship between the scheduling coefficient and arm position. And which relationship is best depends on the particular tension-arm configuration and tension-arm trajectory. Still, the choice of relationship between arm position and the tension-arm and reel scheduling coefficients is ordinarily not critical so long as the scheduling coefficient is a relatively gradual function of tension-arm position. So there is no requirement that the reel and tension-arm scheduling coefficients be the same as those in the illustrated embodiment. For example, the two scheduling coefficients do not have to add up to unity—or any constant, for that matter—although doing so allows one to choose regulator gains $K_{ad}$, $K_{ap}$, $K_{rp}$, and $K_{ri}$ in such a manner as to meet disturbance-rejection, response-time, and stability requirements without regard to the scheduling-function choice.

The present invention avoids to a considerable degree the complexity that attended previous transient-suppression efforts, and it does so by merely combining two control functions that must be provided in any case. It thus constitutes a significant advance in the art.

What is claimed is:

1. A cassette recorder comprising:
   A) a tension-arm servomechanism including a tension arm adapted for training of a tape thereabout, the tension-arm servomechanism being responsive to tension-arm drive signals to apply torque in accordance therewith to the tension arm, which is movable between first and second tension-arm positions and imparts tension to the tape trained thereabout;
   B) a reel servomechanism including a tape reel, adapted for training of a tape thereabout, to which the reel servomechanism applies torque in accordance with tension-arm drive signals applied thereto;
   C) a tension-arm control circuit, responsive to the actual tension-arm position and to a tension-arm-position command signal representing a desired tension-arm position, that generates and applies to the tension-arm servomechanism tension-arm drive signals in accordance with a tension-arm control function that includes a contribution equal to the product of a tension-arm scheduling coefficient and a constituent tension-arm control function of the difference between the actual tension-arm position and the desired tension-arm position, the tension-arm scheduling coefficient being a function of tension-arm position that assumes a first, relatively high tension-arm scheduling-coefficient value when the tension arm is in the first tension-arm position, that assumes a second, relatively low tension-arm scheduling-coefficient value when the tension arm is in the second tension-arm position, and that generally decreases through a range of values between the first and second tension-arm scheduling-coefficient values when the tension arm moves toward the second tension-arm position through a range of tension-arm positions between the first tension-arm position and the second tension-arm position; and
   D) a reel control circuit, responsive to the actual tension-arm position and to a tension-arm-position command signal representing a desired tension-arm position, that generates and applies to the reel servomechanism reel drive signals in accordance with a reel control function that includes a contribution equal to the product of a reel scheduling coefficient and a constituent reel control function of the difference between the actual tension-arm position and the desired tension-arm position, the reel scheduling coefficient being a function of tension-arm position that assumes a first, relatively low reel scheduling-coefficient value when the tension arm is in the first tension arm position, that assumes a second, relatively high reel scheduling-coefficient value when the tension arm is in the second tension-arm position, and that generally increases through a range of values between the first and second reel scheduling-coefficient values when the tension arm moves toward the second tension-arm position through a range of tension-arm positions between the first tension-arm position and the second tension-arm position.

2. A cassette recorder as defined in claim 1 wherein the tension-arm control function further includes a contribution that is independent of the difference between the actual tension-arm position and the desired tension-arm position.

3. A cassette recorder as defined in claim 2 wherein the reel control function further includes a contribution that is independent of the difference between the actual tension-arm position and the desired tension-arm position.

4. A cassette recorder as defined in claim 1 wherein the reel control function further includes a contribution that is independent of the difference between the actual tension-arm position and the desired tension-arm position.

5. A cassette recorder as defined in claim 1 wherein the tension-arm scheduling coefficient equals the difference between a constant and the reel scheduling coefficient.

* * * * *